Figure 1:
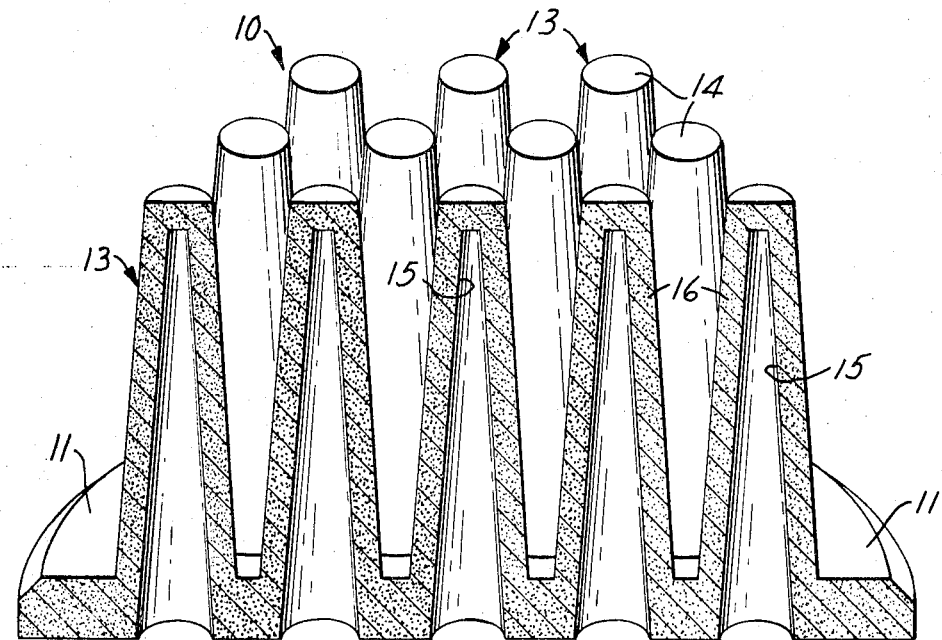

United States Patent [19]
Bergstrom

[11] 3,746,642
[45] July 17, 1973

[54] SINTERED POWDERED METAL FILTER

[75] Inventor: Theodore Bergstrom, Little Canada, Minn.

[73] Assignee: Minnesota Mining and Manufacturing Company, Saint Paul, Minn.

[22] Filed: Apr. 20, 1971

[21] Appl. No.: 135,638

Related U.S. Application Data

[63] Continuation-in-part of Ser. No. 5,019, Jan. 22, 1970, abandoned, Continuation-in-part of Ser. No. 817,673, April 21, 1969, abandoned.

[52] U.S. Cl. .................................. 210/446, 210/496
[51] Int. Cl. ............................................ B01d 39/20
[58] Field of Search ...................... 75/222; 210/496, 210/510, 446, 448; 425/198

[56] References Cited
UNITED STATES PATENTS

| | | | |
|---|---|---|---|
| 2,016,161 | 10/1935 | Wilderman | 210/510 X |
| 2,720,278 | 10/1955 | Wiley | 210/510 X |
| 3,524,548 | 8/1970 | McDonald et al. | 210/496 X |
| 2,826,805 | 3/1958 | Probst et al. | 210/510 X |
| 2,928,733 | 3/1960 | Wagner | 210/510 X |
| 2,580,209 | 12/1951 | Wiley | 210/510 X |
| 1,294,018 | 2/1919 | Zahm et al. | 210/462 |
| 1,328,221 | 1/1920 | Zahm | 210/462 |
| 2,925,913 | 2/1960 | Wheeler, Jr. | 210/323 |

Primary Examiner—Samih N. Zaharna
Assistant Examiner—Richard W. Burks
Attorney—Alexander, Sell, Steldt & Delahunt

[57] ABSTRACT

A unitary uniformly porous filter structure constructed entirely of shaped sintered powdered metal having increased filtering capacity and useful for filtering molten thermoplastic resin, e.g., as it is forced through a spinnerette head. The filter has a planar base portion having hollow protuberances extending from one major surface thereof with cavities of the protuberances extending to the opposite major surface, providing a drainage path. The filter structure is one piece of metal, i.e., the protuberances and the base have continuity and identity of composition.

7 Claims, 2 Drawing Figures

PATENTED JUL 17 1973 3,746,642

INVENTOR.
THEODORE R. BERGSTROM
BY Kinney, Alexander,
Sell, Steldt & DeLaHunt
ATTORNEYS

SINTERED POWDERED METAL FILTER

This application is a continuation-in-part of my prior copending application Ser. No. 5,019, filed Jan. 22, 1970, which application is a continuation-in-part of my prior application Ser. No. 817,673, filed Apr. 21, 1969, both now abandoned.

This invention relates to the filtering of hot plastic masses and to rigid metallic pressure-resistant filter bodies useful therein. In one particular aspect the invention relates to integral filter bodies of sintered metal powder for filtering hot polymeric fiber-forming materials just prior to fiber formation.

U.S. Pat. No. 2,720,278 describes an integral filter of sintered powdered metal. The structure is useful for filtration of air but is incapable of withstanding the high pressure differentials required for filtration of molten polymeric materials.

U.S. Pat. No. 3,570,059 discloses a spinnerette assembly employing a filter having a plurality of small porous tubes that are held in a separate plate by being pressed into openings therein. Such an assembly method makes the filter tubes easily susceptible to dislodgement from the plate and results in numerous locations which are prone to leakage or failure. Such leakage or failure results in loss of product quality or gross variations in fiber denier and/or in the number of fibers.

The filter of this invention is made in one piece entirely of sintered powdered metal to form a metallurgically integral rigid structure which does not have the abovementioned shortcomings. Briefly, the filter is a unitary uniformly porous structure having a perforate planar base portion, such as provided by a perforate disk, and hollow protuberances, such as right cylinders or truncated cones having closed outer ends, extending from one major surface of the base. The cavities of the protuberances extend through the openings in the base to the opposite major surface of the base. The protuberances have a small cross-section and sufficient wall thickness to resist crushing under application of high pressure. The filter is as hereinabove stated one piece of metal. The protuberances and the base preferably have continuity and identity of composition. The filter structure has no parts that have been welded, brazed, pressed-fit or otherwise fastened thereto, thereby substantially eliminating the possibility of failure and leakage from such sources. The term "metallurgically integral" as herein used means that the base portion and the protuberances are bonded together by interatomic diffusion, as are the particles in each of these portions, as a result of sintering the assembly, the sintered filter thus in effect being one piece of metal.

Figure 2:
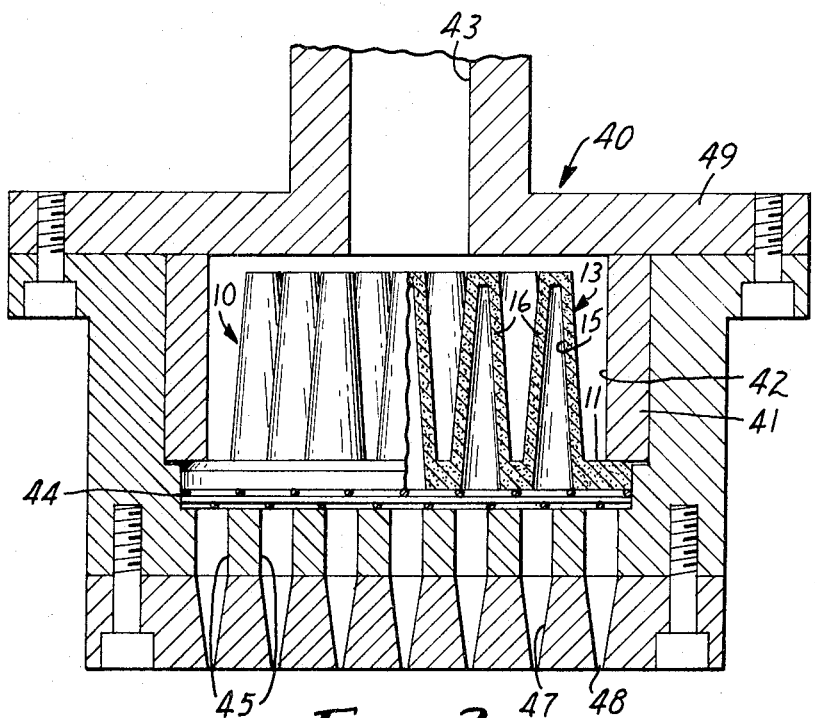

The present invention can best be understood and appreciated by reference to the accompanying drawing wherein:

FIG. 1 is a view partly in perspective and partly in section of a filter having a disk-like base and a plurality of hollow truncated cones extending therefrom; and FIG. 2 is a view in section showing a spinnerette head assembly having a cavity containing a filter (shown in partial section) similar to that shown in FIG. 1.

The unitary uniformly porous filter of the invention, one embodiment of which is shown in FIG. 1, has a planar porous base portion 11 and a plurality of upright hollow porous protuberances, e.g., truncated cones 13, closed at their upper ends 14. The walls 16 and the end 14 provide a porous filter with extended filter surface area. A cavity 15 within the protuberance 13 provides a drainage area which extends to the planar lower surface 17 of the filter. The proximity of the protuberances can vary depending upon the desired surface area. The protuberances can be close together so as to have almost no planar valley between the protuberances, or relatively far apart to provide planar valley areas between the protuberances. The protuberances can be made relatively tall or short depending on the nature of the filtering and the increase in filter surface area desired. Complete plugging of this type of filter by larger particles can be delayed for a considerable period of time. The larger particles will tend to collect at the bases of the protuberances while the upper extremities remain exposed to the bulk of the material being filtered.

For most filtering applications it is desired to have at least a three-fold increase in filtering surface area (over that of the area enclosed by the circumference of the base). Filters having at least seven protuberances can be prepared to give the desired surface area increase. Filters having more than one hundred protuberances become difficult to prepare if they have a small base diameter, e.g., less than 6 inches, because it requires that the protuberances be made very thin and therefore they are easily broken in handling before being sintered.

The area enclosed by the circumference of the protuberance, e.g., cylinder or truncated cone, taken at any place on its height is sufficiently small and its wall is of sufficient thickness to prevent the protuberance from being crushed under application of high pressure. It has been found that if the area enclosed by the circumference of the protuberance is rounded, e.g., circular, oval or egg-shaped, and no greater than one-half square inch, with the maximum dimension of such area being no greater than three-fourths inch, and the thickness of the wall of the protuberance is at least one-sixteenth inch, the protuberance will resist crushing and deformation at high pressures, e.g., pressures in excess of 1,000 pounds per square inch. By increasing the area enclosed by the circumference of the protuberance or decreasing the wall thickness the protuberance becomes more susceptible to crushing. Therefore, the preferred filter structures are those having protuberances with small cross-sectional areas, e.g., less than one-fourth square inch.

When used for filtration of molten thermoplastic polymer the filter of the invention is interposed between the polymer source and the extrusion orifices to remove foreign matter and gross lumps of polymer that resist melting. The most common location for placement of the filter is within a spinnerette head assembly 40 such as shown in FIG. 2. The filter 10 is formed to fit within the cavity 42 of the spinnerette head so that the expanded surface of the filter (the side having the protuberances) is exposed to all of the incoming molten polymer as it enters the cavity through an inlet 43. Tubular ring 42 is placed in pressing contact with the upper surface of the planar portion of filter 10 by spinnerette cover 45 as it is closed providing a seal which prevents leakage around the filter. The filter 10 rests on a perforate support plate such as screen 44 which supports the filter and permits molten polymer to pass unobstructed from the drainage cavities and through the base portion of the filter through conduits 45 and polymer cavity 46 into orifice conduit 47, and out the orifice 48. For such use the planar base portion of the filter generally has a transverse cross-sectional area of at least 2.5 square inches and the base cross-sectional area will be greater than one inch in minimum dimension. The preferred filters have disk-like base portions having a diameter of at least 1.5 inches and thickness of at least one-sixteenth inch.

As mentioned hereinbefore, the filter of this invention is made from conventional sintered powdered metals. An excellent description of the metals is found in "Review of the Powder Metallurgy Process", July, 1966, published by the U.S. Army Production Equipment Agency, Manufacturing Technology Division, Rock Island Arsenal, Illinois. Also see U.S. Pat. No. 3,367,752.

The preferred powdered metals used in forming the filters of this invention include stainless steel, especially austenitic chromium-nickel stainless steel alloys generally containing 16.0 to 26.0 weight percent chromium, 6.0 to 22.0 weight percent nickel, and occasionally some other elements added to develop certain specific properties, such as 1.75 to 4.00 weight percent molybdenum or small amounts of titanium, tantalum, and niobium to minimize formation of chromium carbides. Standard types of these steels have been assigned numbers and specifications by the American Iron and Steel Institute. These are generally known in the art as stainless steels of the AISI 300 series. All of these AISI stainless steels of the 300 series are applicable in the practice of this invention. Of course, other powdered metals can be used in fabricating the filters of this invention, such as nickel, tungsten, copper, and the like, and alloys of such metals, including bronze, monel, etc.

Filters are made from powdered metal which is relatively coarse in order, upon sintering the resulting shaped article, to obtain the desired permeability of micronic rating. For purposes of making filters, mesh sizes in the range of −20+325 can be used, such as −200+325, −100+200, −50+100, −20+50 or blends thereof, suitably selected to produce the desired micronic rating or bubble point, and to that end small amounts of, e.g., 1–20 weight percent of −325 mesh can be blended with the coarse powder, i.e., with the −50+325 mesh. (The term "mesh" referred to herein means mesh size according to U.S. Standard Sieve.) Bubble point, a measure of the air pressure on one surface of a filter required to produce the first air bubble on the submerged opposite surface, corresponds to the absolute micronic rating of the filter as described in WADC TR 56–249. The use of powdered metal with these mesh ranges will enable one to make filter structures in accordance with this invention with various micronic ratings, e.g., in the range of 1 to 150 microns. For purposes of making a filter having a very low micronic rating, e.g., less than 10 microns, powdered metal having a mesh size of −325 can be used.

In fabricating each of the filters the powdered metal of desired mesh is blended with an organic heat-fugitive binder, such as those disclosed in U.S. Pat. Nos., 2,593,943; 2,709,651; and 2,902,363; the preferred binder is methyl cellulose. Solvents can be used in conjunction with these binders, such as water, as well as plasticizers, such as glycerin. The blending can be carried out in a conventional manner in various types of commercially available mixers, blenders, tumblers, and the like, care being taken to insure that the blend is homogeneous and the components well dispersed. The resulting blend will be in the nature of a plastic mass or dough and will be similar in consistency to that of modeling clay. The plastic mass can be shaped in a suitable mold to the desired configuration, and then dried to form a green structure having the hollow protuberances necessary to provide the expanded surface filter. The green structures are formed taking into account the 1–25 percent linear shrinkage which will occur upon sintering and compensating for it by forming the shapes with oversize dimensions.

Filters can be made by pressing a mixture of powdered metal and a heat-fugitive binder in a suitable die. A detailed description of one method of forming the green structures is shown in copending application Ser. No. 5,020, filed Jan. 22, 1970, incorporated herein by reference. Generally, pressed green structures such as these have a minimal structural rigidity and unless the rigidity is increased, it is difficult to remove the pressed structure from the mold without deformation. The pressed green structure can be provided with increased rigidity by in situ drying in the die. Drying can be accelerated through the utilization of reduced pressure and moderate heating. The rigidity can be increased more rapidly by cooling the die to solidify the binder. The die can be cooled by circulating a cooling fluid such as liquid nitrogen, liquid carbon dioxide, or other cold liquids, through coils wrapped around the die. The die can also be submersed in a cold liquid media, such as liquid nitrogen. The binder is burned off in an oxygen-containing atmosphere and then the green structure is sintered under vacuum or a suitable atmosphere, such as a reducing atmosphere like hydrogen or dissociated ammonia. Sintering atmosphere, temperature, and duration of sintering will depend upon the particular powdered metals used, the selection of these conditions being within the skill of the art. In the case of the austenitic stainless steels mentioned above, a hydrogen or dissociated ammonia atmosphere with a dew point of −40° F. or lower and sintering temperatures in the range of 1,200° to 1,400° C., preferably 1,250° to 1,350° C., will be suitable, and the duration of sintering will usually be from 10 minutes to 2 or 3 hours.

As is evident from the above, the filter structure of this invention is made in one piece entirely from powdered metals without requiring or employing wrought metal components. The filter structure has no pressed-fitted parts that could be dislodged. The filter is constructed without welding or reinforcing and is, therefore, free of the disadvantages associated with welding or reinforcing. An important advantage or feature of the filter of this invention is in its integral structure which enables the filter to withstand stresses and other forces normally encountered during operation without being prone to the deformation, rupture, separation or other types of failure experienced with prior art filters which do not have the integral features of this invention. This construction also will withstand reverse flow conditions and back-flushing cleaning operation without the likelihood of failure. Higher operating pressures can be used without fear that the filter structure will rupture or be deformed.

The objects and advantages of this invention are further illustrated by the following example, but particular materials and amounts thereof recited in this example, as well as other conditions and details, should not be construed to unduly limit this invention.

An expanded surface area filter similar to that shown in FIG. 1 was prepared by first mixing 2,850 grams of −100 +200 mesh stainless steel powder (Anchor 316L), 150 grams of molybdenum powder (having an average particle size of about four microns), and 150 grams of 4,000 cps. methyl cellulose (Methocel), dry blending, and then adding 600 cc. of a 15 volume percent solution of glycerin in water, thereupon blending this mixture to a clay-like consistency for 1 hour in a Braebender sigma blade mixer. The batch was then formed into a 0.250 inch thick sheet by passing it through a rubber mill. Two 2¼ inch diameter discs were cut from the formed sheet.

A three-part mold assembly, comprising a mold body, ejection assembly and ram, was used to shape a green structure of the filter. The mold body was formed of steel and had a cylindrical outer wall having several turns of ¼ inch inner diameter copper tubing sweated thereto. The mold body had a 2½ inch diameter opening on one end leading into a mold cavity which was the counterpart of the expanded surface of the filter shown in FIG. 1. The portions of the cavity that would form the protuberances were directed toward the opposite end of the mold body. The opposite end of the mold body had a number of openings corresponding to the number of protuberances of the filter that were in alignment and communication with the portions of the cavity which formed the protuberances, and being approximately equal in diameter to the ends of the protuberances, the ejection assembly had a corresponding number of upright steel pins having the same diameter of the openings. The pins were held on one end on a plate in a pattern corresponding to the pattern of the openings. The ram had a body portion formed of aluminum in a shape that corresponded to the opening of the mold cavity. Pedant from the ram body were nineteen steel truncated cones disposed in a pattern capable of being aligned with the portions of the mold cavity forming the protuberances.

A mold assembly was prepared by passing liquid nitrogen through the cooling coil. The liquid nitrogen flow was continued for about 5 minutes until a layer of frozen condensed water vapor became visible in the mold cavity. During cooling the mold body had the ejection pins inserted into the openings so that the ends of the pins provided a surface for forming the ends of the protuberances of the filter. The aluminum ram was held out of the mold and maintained at room temperature (75° F.). The two discs prepared above were stacked and dropped into the die cavity of the cold mold body. The ram was then quickly lowered and a pressure of 5 tons was applied in a hydraulic press for 5 seconds while holding the ejection pins in fixed position with respect to the mold body. Thereafter the upper ram was retracted and the pressed structure allowed to harden in the die cavity for about 30 seconds. The hardened green structure was then ejected from the die cavity by applying pressure on the ejection pins while holding the mold body in fixed position.

The cold green structure was placed in a freezer at −10° C. for about 4 days and then in an air oven for 2 hours at 150° F. to further dry the structure by evaporating the water. The dried green structure was placed on an inert sagger in a hydrogen furnace and sintered by raising the temperature at a rate of about 100° C. per hour to 1,350° C. and holding at 1,350° C. for 2 hours.

The resulting expanded surface filter had nineteen 0.760 inch high truncated cones on a 2¼ inch diameter 0.230 inch thick disc-like base. The cones were about 0.160 inch in diameter at the top, about 0.304 inch at the bottom and had a substantially uniform wall thickness of about 0.090 inch. The bubble point of the expanded surface area filter was 15 cm. of water which corresponds to an absolute micronic rating of 40 microns by the WADC TR 56–249 method.

An unhardened structure molded from this mixture could not be ejected from the same mold without nearly complete deformation of the truncated cones during ejection.

An expanded surface filter having the dimensions and porosity described above was placed in a spinnerette head assembly on a perforate support plate above the extrusion orifices. Molten polyamide resin (Nylon 6) at a temperature of 262° C. was forced through the spinnerette at an initial pressure of 1,500 psi to maintain a throughput rate of 4 pounds per hour through 34 extrusion orifices producing 70 denier fibers. After 15 days of extruding the run was terminated at which time a pressure of 1,875 psi was required in order to maintain the throughput rate. The filter was removed from the spinnerette and examined. Examination revealed that the filter had maintained its structure without deformation or rupture. In contrast to this the same spinnerette head when filled with a conventional sand and screen filtering pack required an initial pressure of 3,000 psi to produce the same throughput rate. Not only was a higher initial pressure required for the sand and screen filter but it required a more rapid pressure increase to maintain the desired throughput. The sand and screen filter was terminated after 5 days of extruding with a final pressure of 3,450 psi.

What is claimed is:

1. A unitary metallurgically integral porous filter structure of shaped sintered powdered metal and comprising a planar base portion having through the major surfaces thereof a plurality of perforations and having extending from one of said major surfaces a corresponding plurality of erect elongate hollow protuberances with their cavities in alignment with said perforations, said filter being free of welds and surface distortion.

2. The filter structure of claim 1 wherein said hollow protuberances are right cylinders or truncated cones closed at their outer ends.

3. The filter structure of claim 1 wherein said plurality of protuberances comprises from seven to 100 protuberances.

4. The filter structure of claim 1 wherein the total surface area of the outer surface of said protuberances and the exposed surface of said one major surface is at least three times the area enclosed by the circumference of said base.

5. The filter according to claim 1 wherein said powdered metal comprises stainless steel.

6. A unitary uniformly porous filter structure useful for high-pressure filtering of molten fiber-forming thermoplastic resin, said filter structure consisting essentially of shaped sintered powdered metal and comprising a planar base portion having a circumference enclosing a cross-sectional area of at least 2.5 square inches, said area being greater than one inch in minimum dimension, said base portion having through the major surfaces thereof a plurality of perforations and having extending from one of said major surfaces a corresponding plurality of erect elongate hollow protuberances with their cavities in alignment with said perforations, said base and said protuberances each having continuity and identity of composition, said protuberances each having a circumference enclosing a cross-sectional area of less than one-half square inch and the area being less than three-fourths inch in maximum dimensions and having a protuberance wall thickness of at least one-sixteenth inch, whereby is provided a filter structure having protuberances capable of withstanding crushing under application of high pressure.

7. A spinnerette head assembly for the extrusion of synthetic polymer fibers including tubular housing closed on the end providing a liquid-tight filter chamber, one of said closed ends having an inlet opening and the other having extrusion orifices wherein the improvement comprises interposing within said chamber between said first closed end and said second closed end the filter structure of claim 6.

* * * * *